United States Patent [19]

Hsieh et al.

[11] Patent Number: 5,096,868

[45] Date of Patent: * Mar. 17, 1992

[54] CATALYST COMPOSITION FOR POLYMERIZING ALPHA-OLEFINS AND ALPHA-OLEFINS POLYMERIZATION THEREWITH

[75] Inventors: John T. T. Hsieh, Warren, N.J.; Jeanne C. Simondsen, Gurnee, Ill.

[73] Assignee: Mobil Oil Corporation, Fairfax, Va.

[*] Notice: The portion of the term of this patent subsequent to Jan. 3, 2006 has been disclaimed.

[21] Appl. No.: 517,952

[22] Filed: Apr. 27, 1990

Related U.S. Application Data

[63] Continuation of Ser. No. 339,955, Apr. 18, 1989, abandoned, which is a continuation of Ser. No. 111,944, Oct. 21, 1987, abandoned, which is a continuation-in-part of Ser. No. 939,323, Dec. 8, 1986, abandoned, which is a continuation-in-part of Ser. No. 777,805, Sep. 19, 1985, abandoned.

[51] Int. Cl.$^5$ .......................... C08F 4/643; C08F 4/69
[52] U.S. Cl. .......................... 502/107; 502/113; 502/242; 502/256; 502/305; 502/309; 526/105; 526/106
[58] Field of Search ............... 502/107, 113, 242, 309, 502/256, 305

[56] References Cited

U.S. PATENT DOCUMENTS

| | | | |
|---|---|---|---|
| 3,135,809 | 6/1964 | Bosmajian | 502/103 |
| 3,225,023 | 12/1965 | Hogan et al. | 526/106 X |
| 3,351,623 | 11/1967 | Walker et al. | 526/97 |
| 3,591,656 | 7/1971 | Kroll | 502/107 X |
| 3,622,521 | 11/1971 | Hogan et al. | 526/96 X |
| 3,879,368 | 4/1975 | Johnson | 526/113 |
| 3,925,338 | 12/1975 | Ort | 526/97 X |
| 3,953,414 | 4/1976 | Galli et al. | 526/348 |
| 3,960,826 | 6/1976 | Aboutboul et al. | 526/103 |
| 4,011,382 | 3/1977 | Levine et al. | 526/96 |
| 4,056,669 | 11/1977 | Ballard et al. | 526/154 |
| 4,065,612 | 12/1977 | Hamer et al. | 526/114 X |

(List continued on next page.)

FOREIGN PATENT DOCUMENTS

| | | |
|---|---|---|
| 2242752 | 8/1971 | Fed. Rep. of Germany . |
| 1415648 | 11/1975 | United Kingdom . |
| 2023153A | 12/1979 | United Kingdom . |

OTHER PUBLICATIONS

"Supported Chromium Catalysts for Ethylene Polymerization", *Events in Catalysis*, pub. by Academic Press (1985), pp. 47-98, McDaniel.
McDaniel, M. P. et al., "The Activation of the Phillips Polymerization Catalyst", Parts I, II and III, *Journal of Catalysis* 82, (1983), pp. 98-126.
McDaniel, M. P., "Supported Chromium Catalysts for Ethylene Polymerization", *Advances in Catalysis*, 33 (1985), pp. 47-98.
Hsieh, Ser. No. 278,096, filing date 11/30/88.
Hsieh, Ser. No. 454,538, filing date 12/21/89.

*Primary Examiner*—Patrick P. Garvin
*Attorney, Agent, or Firm*—Alexander J. McKillop; Charles J. Speciale; Marina V. Schneller

[57] ABSTRACT

A supported catalyst for polymerizing 1-olefins, for example, ethylene, is prepared by depositing a chromium compound and a titanium compound on a refractory oxide support which is substantially non-spherical, and which has a relatively broad particle size distribution range. The catalyst is preferably combined, either outside of the polymerization vessel or in situ, with a sufficient amount of at least one magnesium composition of the formula $RMgR'$, where R and R' are the same or different and they are $C_1$ to $C_{12}$ hydrocarbyl groups, to provide a molar ratio of magnesium to chromium in the catalyst composition of about 0.01:1 to about 25:1. The resulting catalyst composition has good feedability and fluidization characteristics, and it produces resins of relatively high HLMI at relatively low temperatures.

There is also disclosed a process for polymerizing 1-olefins, at relatively lower temperatures than was heretofore possible, to obtain resins of relatively high HLMI, using the above-identified catalyst composition. The resulting polymers can be used for the fabrication of blow-molded products, e.g., household and industrial containers.

55 Claims, 1 Drawing Sheet

U.S. PATENTS DOCUMENTS

| | | | |
|---|---|---|---|
| 4,100,337 | 7/1978 | Noshay et al. | 526/130 |
| 4,115,639 | 9/1978 | Brown et al. | 526/130 |
| 4,169,926 | 10/1979 | McDaniel | 526/106 |
| 4,190,457 | 2/1980 | McDaniel | 106/122 |
| 4,321,159 | 3/1982 | Bressler et al. | 526/97 X |
| 4,328,124 | 5/1982 | Speca et al. | 526/106 |
| 4,368,302 | 1/1983 | Downs | 526/105 |
| 4,374,234 | 2/1983 | Stricklen et al. | 526/105 |
| 4,426,315 | 1/1984 | Bahadir et al. | 526/124 X |
| 4,434,243 | 2/1984 | Martin | 502/171 |
| 4,517,345 | 5/1985 | Eve et al. | 526/105 |
| 4,522,987 | 6/1985 | Hogan et al. | 526/106 |
| 4,559,321 | 12/1985 | Slaugh | 502/263 |
| 4,801,572 | 1/1989 | Hsieh | 502/242 |
| 4,816,432 | 3/1989 | Hsieh | 502/107 |
| 4,946,914 | 8/1990 | Hsieh | 526/106 |

CATALYST COMPOSITION FOR POLYMERIZING ALPHA-OLEFINS AND ALPHA-OLEFINS POLYMERIZATION THEREWITH

CROSS-REFERENCE TO RELATED APPLICATIONS

This is a continuation of Ser. No. 339,955, filed on Apr. 18, 1989 and now abandoned, which was a continuation of Ser. No. 111,944, filed on Oct. 21, 1987 and now abandoned, which was a continuation-in-part of application Ser. No. 939,323, filed on Dec. 8, 1986 and now abandoned, which was a continuation-in-part of application Ser. No. 777,805, filed on Sept. 19, 1985, now abandoned. The entire contents of all of the aforementioned prior applications are incorporated herein by reference.

BACKGROUND OF THE INVENTION

1. Field of the Invention

The present invention is directed to a chromium compound-containing catalyst for polymerizing alpha-olefins, also known as 1-olefins, to a method for producing such a catalyst and to a method of polymerizing such olefins. More particularly, the invention is directed to a method of producing polymers of ethylene or copolymers of ethylene and at least one $C_3$–$C_{10}$ alpha-olefin, which are useful in the fabrication of products for blow molding applications, especially for the household and industrial containers (HIC) market, at lower temperatures than was heretofore possible.

2. Description of the Prior Art

Chromium compound-containing alpha-olefin polymerization catalysts, also known as Phillips catalysts, have been extensively described in the literature. They are formed by supporting chromium trioxide, or a compound calcinable thereto, on a refractory oxide support material, for example, silica, alumina, zirconia, thoria or silica-alumina, and heating the oxide support material in a non-reducing atmosphere, preferably an oxidizing atmosphere, to produce an active polymerization catalyst. The produced catalyst is used to polymerize 1-olefins using the so-called "solution form" or "particle form" process. In the "solution form" process, the monomeric 1-olefin, which is normally ethylene or a mixture of ethylene with up to about 40 wt. % of other 1-olefins, is contacted with a suspension of the catalyst in a liquid hydrocarbon which is a solvent for the polymer at the polymerization temperature employed. In the "particle form" process, the monomer 1-olefin is contacted with a suspension or a fluidized bed of the catalyst particles in a fluid medium under conditions such that the polymeric 1-olefin forms as solid particles suspended in or fluidized in the fluid medium. The fluid medium can be, for example, a liquid hydrocarbon or a gas. Examples of suitable liquid hydrocarbons are isobutane and n-pentane. Examples of suitable gases are nitrogen or argon mixed with the gaseous monomer, or the undiluted gaseous monomer. Processes of this type are described in, for example, U.K. published patent specifications 790,195; 704,641; 853,414; 886,784 and 899,156. It is also known to modify such catalysts with a titanium compound, for example, to render the catalyst capable of producing polyolefins having increased melt index (i.e., lower average molecular weight) or to increase the stress crack resistance of the produced polyolefin. Catalysts of this type are described in, for example, U.S. Pat. No. 3,622,521 to Hogan et al and U.K. published patent specifications 1,334,662 and 1,326,167.

U.S. Pat. No. 3,351,623 to Walker et al discloses a catalyst for polymerizing ethylene at a temperature in the range of 275° to 335° F., i.e., under solution form process conditions, the catalyst being one which forms on mixing (1) an oxide component selected from the group consisting of silica; mixtures of silica and alumina containing up to 25 wt. % alumina; and mixtures of chromium oxide and at least one material selected from the group consisting of silica, alumina, zirconia and thoria, at least part of the chromium oxide being in the hexavalent state at the initial contacting of the monomer therewith, (2) an organo metallic component of formula $R_xM$ where R is selected from the group consisting of hydrogen and alkyl, aryl, cycloalkyl, alkoxy radicals and combinations of these radicals containing up to 12 carbon atoms, at least one R group being a hydrocarbon radical; M is selected from the group consisting of aluminum, gallium, indium, thallium, zinc, boron, lead, lithium, zirconium, cobalt, magnesium and tin; and x is an integer equal to the valence of M, and (3) a vanadium component selected from the group consisting of vanadium chelates and vanadyl chelates. Walker et al seek to produce a catalyst that permits the use of high polymerization temperatures to obtain relatively low melt index polymer.

Downs, U.S. Pat. No. 4,368,302, discloses a modified alpha-olefin catalyst composition used in preparing polymers of ethylene or copolymers of ethylene and higher alpha-olefins, having a relatively broad molecular weight distribution, as evidenced by relatively high values of melt flow ratio (MFR), referred to by Downs as melt index ratio (MIR). The catalyst composition of Downs is prepared by supporting chromium oxide on a refractory oxide support material, adding at least one tetravalent titanium compound and heating to activate the product. The monomer is contacted with the active polymerization catalyst in the presence of one or more organometallic compounds, e.g., triethylaluminum. The refractory oxide support has a mean particle diameter of about 20–150 microns ($\mu$).

U.K. Patent Application 2,023,153 to Eve discloses an ethylene polymerization catalyst comprising: (A) a heat activated supported chromium oxide catalyst, and (B) a catalyst modifier comprising a magnesium compound, such as a dialkyl magnesium, preferably dibutyl magnesium, and a commercially available product believed to comprise a mixture of dibutyl magnesium, dialkyl magnesium and butyl-alkyl magnesium. The polymerization process, conducted in the presence of this catalyst, produces polyethylene or ethylene copolymers having broad molecular weight distribution and low melt index. The quantity of the catalyst modifier is such that the atomic ratio of magnesium to chromium in the modified catalyst system is 0.01:1 to 100:1, preferably, 0.01:1 to 10:1.

Stricklen et al., U.S. Pat. No. 4,374,234, disclose a silica-supported chromium catalyst to which is added up to 5 ppm of an aluminumalkyl or dihydrocarbomagnesium compound in order to reduce the induction period and increase catalyst activity. The addition of the aluminum or the magnesium compounds has only a modest effect on polymer properties.

When polymers of ethylene or copolymers of ethylene and of one or more $C_3$–$C_{10}$ alpha-olefin useful for the blow-molding applications, e.g., for the HIC market, are produced using the above-identified prior art catalysts in a fluid bed reactor, the reaction must either be conducted at relatively high temperatures of about 108°-110° C., approaching melting or sintering temperatures of the product resin, or with a relatively high level of oxygen intentionally added to the reactor (oxygen add-back) to produce a resin having the desired high load melt index (HLMI).

The operation of fluid bed reactor at the high temperature requires very elaborate control apparatus to prevent fusion of the resin particles, particularly the small size resin particles (fines), e.g., particles of the size less than 74 microns ($\mu$) in the reactor, and particularly downstream of the reactor, e.g., in the recycle compressor. Since a typical resin produced with such a catalyst begins to melt and agglomerate at about 113° C., even minute temperature excursions above the reactor operating temperature can cause severe fines agglomeration, referred to in the art as fouling, in the process equipment downstream of the reactor, e.g., compressor and heat exchangers, due to melting and fusion of the fines.

As is known to those skilled in the art, the fluid bed alpha-olefin polymerization reactor system utilizes a recirculation compressor to recycle the fluidizing gas and unreacted monomers, if any, to the fluid bed reactor. The recycled fluidizing gas also contains at least some entrained polymer particles. The system also utilizes heat exchangers, usually located downstream of the compressor, to remove substantial amounts of exothermic heat generated during the reaction (e.g., see Goeke et al, U.S. Pat. No. 4,302,565). The compressor inherently increases the temperature of the gas stream compressed therein. Since the temperature gradient between the fluid bed reactor operating temperature and the melting temperature of the resin is very small (e.g., about 7°-9° C.), even a small elevation of the temperature of the fluidizing gas may cause fusion and agglomeration of the polymer particles in the compressor. If the temperature of the recycle gas is increased to the level wherein the fusion of the polymer particles takes place, the polymer particles will also tend to fuse and agglomerate in the heat exchangers and on the distribution plate of the reactor utilized to provide a uniform fluidized bed of particles therein.

The danger of polymer particles' fusion is exacerbated by the presence of catalyst particles in the polymer particles. As is known to those skilled in the art, the product polymer particles, also referred to herein as resin particles, produced in the polymerization reactor system, contain minute amounts of the catalyst particles which are not removed therefrom because the content thereof in the resin is so small as to render the removal of the catalyst particles unnecessary. The catalyst is inactivated when the resin is removed from the reactor. However, the resin in the reactor system contains catalytically-active catalyst particles. These catalytically-active catalyst particles continue to promote the alpha-olefin polymerization reaction which is exothermic in nature, thereby producing an additional amount of heat. This heat, together with the inherent increase of the recycle gas temperature in the recycle compressor, combines to dangerously decrease the safety temperature margin between the reactor operating temperature and the resin fusion temperature. The polymer particles most susceptible to fusion are polymer fines. If fusion and agglomeration of polymer particles takes place in the recycle compressor, heat exchangers, distribution plate and/or any other parts of the polymerization system, the process efficiency is substantially decreased, and, ultimately, the fluidized bed system may have to be shut down to remove the fused polymer particles.

As mentioned above, the HLMI of the resin may also be increased by increasing the amount of oxygen added to the reactor, e.g., see Dalig et al. *KHIMIYA I TEKNOLOGIYA POLYMEROV*, Vol. 23, No. 4 (1961), Ermakov et al, "Transfer Processes During Polymerization of Ethylene on a Chromium Oxide Catalyst. II. The Role of Impurities In Transfer Reactions", *KINETICS AND CATALYSIS (USSR)*, Vol 10, No. 333 (1969). However, the increased oxygen content in the reactor may promote the formation of polymer fines, which are most likely to fuse in the reactor system. The alpha-olefin fluidized bed reactors, unlike fluidized bed reactors used in different chemical processes, e.g., fluid catalytic cracking, do not usually utilize fines removing equipment, such as cyclones or filters, because it is feared that such equipment may provide additional sites for fines to fuse and agglomerate. Thus, any polymer fines produced in the polymerization system tend to remain in the reactor loop. Accordingly, the use of relatively high amounts of oxygen to obtain resins of a desired HLMI may also lead to the fouling of the process equipment, such as compressor and heat exchangers, and, ultimately, to the shut-down of the reactor system.

Additional problems encountered in the operation of the fluid bed polymerization system include the difficulty of feeding the catalyst into the fluid bed reactor without clogging up the feeding mechanism and difficulty of fluidizing the catalyst, as evidenced by sheeting in the reactor (e.g., see Hamer et al, U.S. Pat. No. 4,293,673 and Fulks et al, U.S. Pat. No. 4,532,311). Hamer et al teach that spherically-shaped catalyst particles are easier to fluidize than irregularly-shaped particles.

Accordingly, it is a primary object of this invention to provide an improved polymerization catalyst which produces polymers of HLMI suitable for the blow molding applications at substantially lower operating temperatures than was heretofore possible with other catalysts utilized in a fluid bed reactor at comparable conditions.

It is another object of the invention to provide a polymerization catalyst which produces relatively low levels of polymer fines, as compared to other catalysts utilized in a fluid bed reactor to produce polymers of comparable properties.

It is yet another object of the invention to provide a polymerization catalyst exhibiting good feedability characteristics in a fluid bed reactor.

It is an additional object of the present invention to provide an alpha-olefin polymerization process which produces polymers of ethylene and/or $C_3-C_{10}$ alpha-olefins, having such an HLMI that renders them suitable for the blow molding applications at lower temperatures than was heretofore thought possible, and with reduced polymer fines formation.

Additional objects of the invention will become apparent to those skilled in the art from the following specification and the attached claims.

SUMMARY OF THE INVENTION

Polymers suitable for the blow molding applications, such as for the HIC market, are prepared at relatively low polymerization temperature, substantially below the polymer resin sintering temperature, in the presence of a supported chromium-compound and a tetravalent titanium compound-containing alpha-olefin polymerization catalyst synthesized by a process detailed below. The catalyst is synthesized with a refractory oxide support which produces catalyst particles which are substantially non-spherical and irregular in shape and which have a relatively broad particle size distribution range. The support has at least 75% of its pore volume in pores of about 200 to about 500 Angstrom diameter. The catalyst is also synthesized with at least one tetravalent titanium compound; with $CrO_3$ or any compound of chromium calcinable thereto; and it is activated by heating the catalyst for at least about 10 hours at a temperature of at least about 800° C.

In a preferred embodiment, the catalyst of the invention is combined with a sufficient amount of at least one magnesium composition of the formula RMgR', wherein R and R' are the same or different and they are $C_1$-$C_{12}$ hydrocarbyl groups, to provide a molar ratio of magnesium to chromium in the final catalyst composition of from about 0.01:1 to about 25:1.

BRIEF DESCRIPTION OF THE DRAWING

The FIGURE is a schematic representation of a fluidized gas phase reaction apparatus which can be used to prepare polymers in the presence of the catalyst of this invention.

DETAILED DESCRIPTION OF THE INVENTION

Figure 1:
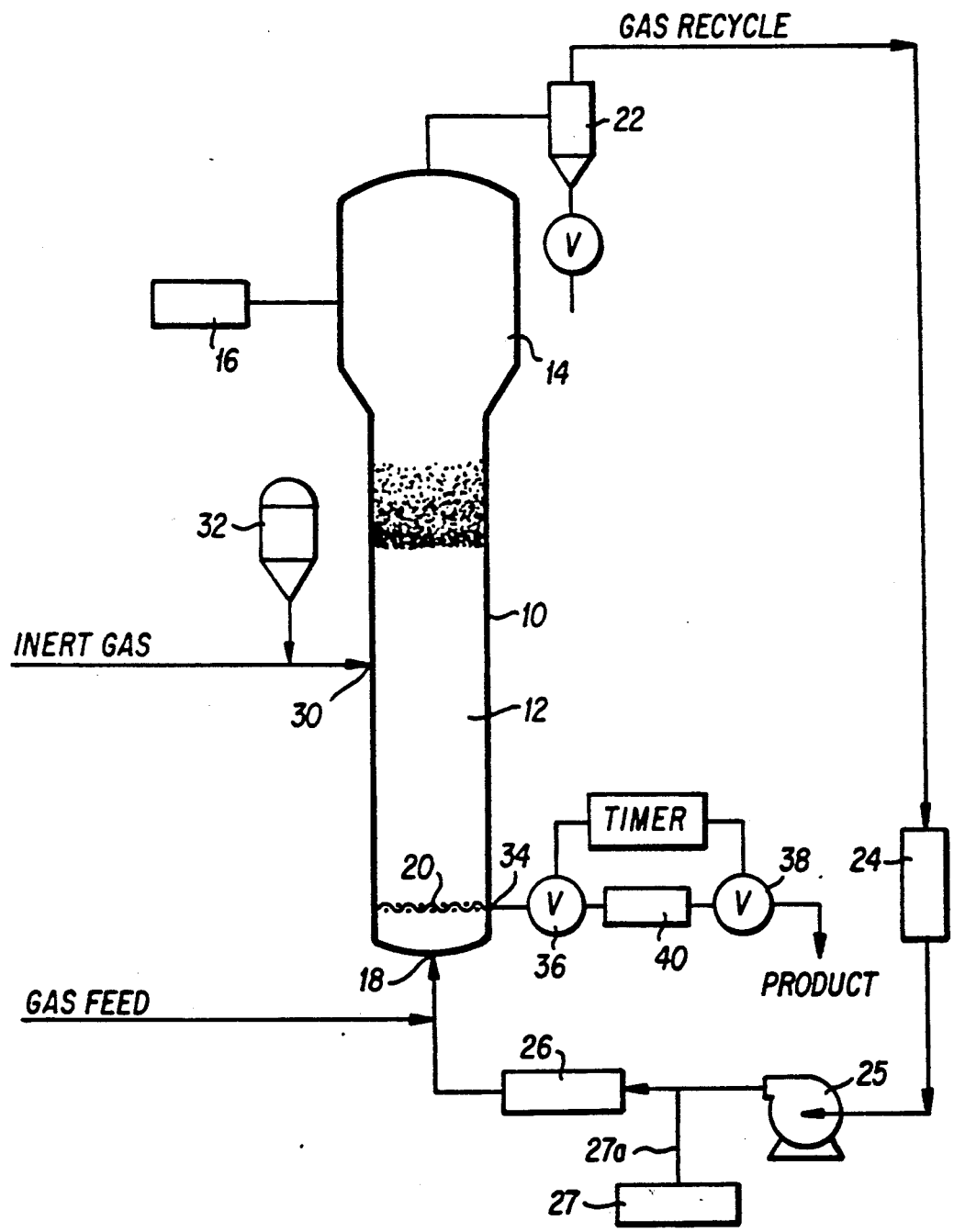

The catalyst of the present invention is prepared in a process comprising the steps of:

1. drying or dehydrating the refractory oxide support material at a temperature of about 100° to about 500° C., preferably about 150° to about 300° C. and most preferably at about 200° C. for at least about 14 hours (hrs), preferably at least about 16 hours, and most preferably for about 16 hrs in a nitrogen atmosphere;
2. depositing a chromium compound onto the dried support;
3. contacting the thus-obtained catalyst intermediate with at least one tetravalent titanium compound; and
4. purging the flammable components with nitrogen, preferably at about 325° C., and subsequently thermally activating the resulting solid, in an air atmosphere, at a temperature of at least about 800° C., preferably at least about 820° C., more preferably at about 820° to about 870° C., and most preferably at about 825° C. for at least about 10 hrs; preferably at least about 14 hrs, more preferably for at least about 16 hrs, and most preferably for about 16 hrs, to obtain an active catalyst composition.

In a preferred embodiment, the refractory oxide support has a chromium compound deposited thereon prior to the drying or dehydration thereof in step 1. Also, in a preferred embodiment, the thus-obtained active catalyst product of step 4 is contacted with at least one magnesium composition of the formula RMgR'.

The refractory oxide support material employed herein can be any support known in the art, such as silica, silica-alumina, silica-titania, alumina, zirconia or thoria, so long as it produces catalyst particles which are non-spherical and irregular in shape and of such size that the diameter of the catalyst particles is about 5 to about 250 microns ($\mu$), preferably about 10 to about 200$\mu$ as determined by Scanning Electron Microscopy (SEM). The majority of the particles of the catalyst must have relatively large particle diameters. Thus, the catalyst has a median particle diameter of about 50 to about 100, preferably about 60 to about 80 and most preferably about 75$\mu$ as determined by volume distribution using a HIAC-ROYCO PA-720 particle size analyzer, and it has the following particle size distribution:- cumulative volume distribution —10 to 90% of the particles have diameters of about 28 to about 150, preferably about 30 to about 125 and most preferably about 37 to about 117$\mu$, also as determined in a HIAC-ROYCO particle size analyzer. Additionally, the refractory oxide support must have at least 75% of its pore volume in the pores of about 200 to about 500 Angstrom diameter, preferably at least 80% of its pore volume is in the pores of about 250 to about 450 Angstrom diameter, and most preferably at least 85% of its pore volume is in the pores of about 250 to about 450 Angstrom diameter. The most preferred refractory oxide support material is silica containing about 0.18% by weight of chromium trioxide ($CrO_3$) and having about 88% of its pore volume in the pores of about 250 to about 450 Angstrom diameter, particle diameter of about 10 to about 200 microns, available commercially from Joseph Crosfield & Sons Ltd., Applied Silicas Division, Warrington, England, under the tradename of SD-186.

The chromium compound and the tetravalent titanium compound are usually deposited on the support from the solutions thereof and in such quantities as to provide, after the activation step, the desired levels of chromium (Cr) and titanium (Ti) in the catalyst. The order of addition of the chromium and the titanium compounds to the support is not critical, provided that such compounds are added before the activation of the catalyst and the support is dried before the titanium compound is added thereto. However, it is preferred to deposit the chromium compound onto the support before the titanium compound.

The chromium compound is $CrO_3$ or any compound of chromium which is calcinable thereto under the activation conditions employed herein. At least a portion of the chromium in the supported, activated catalyst must be in the hexavalent state. Chromium compounds, other than $CrO_3$, which may be used are disclosed in U.S. patents to Hogan et al., U.S. Pat. Nos. 2,825,721 and 3,622,521, the disclosures of which are incorporated herein by reference, and include chromium nitrate, chromium carbonate, chromium acetate, ammonium chromate, chromium chloride, tertiary butyl chromate, chromium acetylacetonate, and chromium sulphate.

Water soluble compounds of chromium, such as $CrO_3$, are the preferred compounds used to deposit the chromium compound on the refractory oxide support from a solution of the compound. However, organic solvents-soluble chromium compounds may also be used.

After the chromium compound is deposited on the support, the chromium compound-containing support is dehydrated or dried at the aforementioned conditions.

Subsequently, the dehydrated catalyst intermediate is contacted with a titanium compound or compounds. Suitable titanium compounds which may be used include all titanium compounds which are oxidizable to $TiO_2$ under the activation conditions employed, and include those disclosed in U.S. Pat. No. 3,622,521 and Netherlands Patent Application 72-10881 (the disclosures of both of which are incorporated herein by reference). These compounds include those having the structures $(R_1)_nTi(OR_1)_m$, $(R_2O)_mTi(OR_1)_n$, $(R_1)_nTiX_m$, $(RO)_nTiX_m$ and $TiX_4$ where m is 1, 2, 3 or 4, n is 0, 1, 2 or 3 and $m+n=4$; $R_1$ is a $C_1$ to $C_{12}$ alkyl, aryl or cycloalkyl group, and combinations thereof, such as aralkyl and alkaryl groups, $R_2$ is $R_1$, a cyclopentadienyl group, $C_2$ to $C_{12}$ alkenyl groups, such as ethenyl, propenyl, isopropenyl or butenyl, and X is chlorine, bromine, fluorine or iodine.

The titanium compounds thus include titanium tetrachloride, titanium tetraisopropoxide and titanium tetrabutoxide. The most preferred titanium compound is tetraisopropyltitanate. The titanium compounds are conveniently deposited on the support from a hydrocarbon solvent solution thereof. The amount of the titanium compound used is such that there is an excess of the moles of titanium (calculated as elemental titanium) with respect to the moles of chromium (calculated as elemental chromium) in the catalyst composition. Thus, the titanium (calculated as elemental titanium) is present in the final catalyst product, with respect to the chromium (calculated as elemental chromium), in a molar ratio of about 0.5 to about 180, and preferably about 4 to about 35.

After the titanium compound is deposited on the catalyst, the resulting solid material is activated at the aforementioned conditions.

The activated supported catalyst contains, based on the combined weight of the support and the chromium and titanium therein, about 0.05 to about 3.0, preferably about 0.10 to about 25, more preferably about 0.13 to about 0.18 and most preferably about 0.15 to about 0.18 weight percent of chromium (calculated as elemental chromium), and about 1.5 to about 9.0, preferably about 3.0 to about 7.0 and most preferably about 3.7 to about 6.0 weight percent of titanium (calculated as elemental titanium).

In a preferred embodiment, the activated catalyst composition is combined with at least one magnesium composition, also referred to herein as a magnesium modifier, having the formula RMgR' where R and R' are the same or different and they are $C_1$ to $C_{12}$ hydrocarbyl groups, preferably $C_1$ to $C_8$ hydrocarbyl groups. Suitable hydrocarbyl groups are alkyl, alkenyl and aromatic groups, such as methyl, ethyl, propyl, n-butyl, iso-butyl, cyclobutyl, n-pentyl, iso-pentyl, cyclo-pentyl, hexyl, ethenyl, propenyl, 1-butenyl, 2-butenyl, benzyl, toluyl and ortho-, meta- and para-xylyl. Preferably, $R_1$ and $R_2$ are the same or different and they are $C_1$ to $C_6$ alkyl groups, more preferably $C_2$ to $C_4$ normal alkyl groups, and most preferably both R and R' are normal-butyl (n-butyl). An example of a commercially available, most preferred magnesium composition used in this embodiment is a product of the empirical formula (n-butyl)$_{0.9}$(n-octyl)$_{0.1}$Mg(sec-butyl), having the average formula weight of 145. The amount of the magnesium composition used is such that the molar ratio of magnesium (calculated as elemental magnesium) to chromium (calculated as elemental chromium) in the final catalyst composition is about 0.01:1 to about 25:1, preferably it is about 0.1:1 to about 15:1 and most preferably it is about 0.5:1 to about 3:1. It was found that the combination of the magnesium modifier with the activated catalyst composition of this invention produces resins having a relatively high HLMI, low die swell characteristics, high top load strength values, and high environmental stress crack resistance characteristics.

Although the magnesium modifier can be combined with the activated catalyst either outside of the polymerization reaction vessel, before the catalyst is introduced thereinto, or simultaneously with the introduction of the catalyst into the polymerization reaction vessel, it is preferred to combine it with the catalyst outside of the polymerization reaction vessel to facilitate the control of the magnesium modifier concentration. If the magnesium modifier is introduced into the polymerization reactor separately from the activated catalyst composition, the rate of feed of the magnesium modifier into the polymerization reactor must be such that the aforementioned molar ratios of magnesium to chromium on the catalyst are maintained.

The catalyst is used to polymerize either ethylene alone or ethylene in conjunction with higher monomers, such as any one of $C_3$–$C_{10}$ alpha-olefins, e.g.m 1-butene, 1-pentene, 1-hexene, 4-methyl-1-pentene, 1-heptene or 1-octene, preferably 1-butene, 1-pentene, 1-hexene or 4-methyl-1-pentene and most preferably 1-hexene. The polymerization reaction is preferably carried out in a fluid bed reactor, as described below, and substantially in the absence of catalyst poisons, such as moisture, carbon monoxide and acetylene, with a catalytically effective amount of the catalyst at a temperature and pressure conditions sufficient to initiate the polymerization reaction.

In order to achieve density ranges of about 0.915 to about 0.965 g/cc in the copolymers, which includes the range of about 0.947 to about 0.959 g/cc required for HIC applications, it is necessary to copolymerize enough of the $C_3$ or higher comonomers with ethylene to achieve a level of about 0.1 to about 25 mole percent of the $C_3$ to $C_{10}$ comonomer in the copolymer. The amount of comonomer needed to achieve this result will depend on the particular comonomer(s) being employed. Further, the various intended comonomers have different reactivity rates, relative to the reactivity rate of ethylene, with respect to the copolymerization thereof with the catalysts of the present invention. Therefore, the amount of comonomer used in the stream of monomers fed to the reactor will also vary depending on the reactivity of the comonomer.

In the most preferred embodiment, the catalyst of the present invention is used to polymerize 1-hexene and ethylene in a fluid bed process to obtain polymers having the density of about 0.947 to about 0.959 g/cc, which are especially suitable for HIC applications.

The catalyst composition of this invention is especially suitable for producing polymers of $C_2$–$C_{10}$ alpha-olefins in a gas phase, fluid bed reactor in the presence of about 0 to about 0.35 ppmw of oxygen, calculated on the basis of ethylene feed because it makes possible the operation of the reactor at a temperature not higher than about 108° C., preferably not higher than about 105° C., to produce polymer resins having acceptable HLMI values of about 25–50, preferably about 30–45. As is known to those skilled in the art, heretofore-used Phillips catalysts required gas phase fluid bed reactor temperatures of about 108° C.–110° C. to produce polymer resins having the aforementioned HLMI values. The resins must have these HLMI values to render them suitable for processing in blow-molding machines to produce products for the HIC market, such as bottles having high environmental stress crack resistance. Since the resins begin to fuse and agglomerate at about 113° C., the reactor operation at about 108°–110° C. may, and occasionally does, cause at least partial fusion of fine resin particles downstream of the fluidized bed reactor, e.g., in the compressor used to recirculate the reactor gases. In prior art, the HLMI of the resin was also increased by increasing the amount of oxygen or oxygen-containing gas (oxygen add-back), such as air, added to the gas phase, fluid bed reactor. While the reactor operation with the higher oxygen add-back increased the HLMI to the desired level, it also created additional quantities of resin fines which increased the risk of fouling of the process equipment, such as the gas recirculation compressor and heat exchangers.

The catalyst composition of this invention substantially decreases, if not completely eliminates, the danger of process equipment fouling because, at a given level of oxygen introduced into the reactor, it enables the operation of the polymerization reaction at a substantially lower temperature than was heretofore thought possible to produce polymer resins having the desired HLMI values. Thus, the safety margin between the reactor operating temperature and the resin fusion temperature is increased, thereby reducing, if not substantially eliminating, the danger of equipment fouling by the fused (melted) resin particles.

The operation of the fluidized bed reactor with the catalyst of the invention also produces substantially reduced amounts of polymer fines, as compared to the operation of the reactor used to produce polymers of comparable properties with the previously-available Phillips catalyst compositions. Since the polymer fines are most likely to fuse when the temperature safety margin is decreased, e.g., in the compressor or due to unanticipated temperature surges, the low level of fines provides additional protection against polymer fusion and agglomeration in the polymerization system.

Additionally, the feedability characteristics of the catalyst of this invention are improved in comparison to some prior art Phillips catalysts, as evidenced by the lack of agglomeration of the catalyst particles in the feeder of the fluid bed polymerization reactor. As discussed above, prior art catalyst compositions sometimes tended to clog up the feeding mechanism of the fluid bed reactor necessitating frequent process interruptions. The catalyst of this invention exhibits substantially no tendency to clog up the fluid bed reactor feeding mechanism.

The catalyst of the invention also has very good fluidizing properties, as evidenced by the substantial lack of sheeting in the reactor. This is especially surprising and unexpected since the prior art taught that spherically-shaped catalyst particles are easier to fluidize than irregularly shaped catalyst particles (see Hamer et al, U.S. Pat. No. 4,293,673). However, we found that the catalyst of this invention, having non-spherical, irregularly-shaped particles, has very good fluidizing characteristics, in addition to the advantages detailed above.

The reason or reasons for the good feedability, fluidization properties, the ability to produce resins of required HLMI characteristics at relatively low temperatures and other advantages of the catalyst of this invention are not fully understood at the present time. However, without wishing to be bound by any theory of operability, it is believed that the feedability and fluidization properties of the catalyst are attributed, at least in part, to morphology, i.e., size and shape of the catalyst, as specified above.

A fluidized bed reaction system which can be used in the practice of the process of the present invention is illustrated in FIG. 1. With reference thereto, a reactor 10 consists of a reaction zone 12 and a velocity reduction zone 14.

The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$, and more preferably from about 3 to about 6 times $G_{mf}$. The term $G_{mf}$ is used herein in the accepted form as the abbreviation for the minimum mass gas flow required to achieve fluidization, see C. Y. Wen and Y. H. Yu, "Mechanics of Fluidization", *Chemical Engineering Progress Symposium Series*, Vol. 62, p. 100–111(1966).

The partially or completely activated catalyst used in the fluidized bed is preferably stored for service in a reservoir 32 under a blanket of a gas which is inert to the stored material, such as nitrogen or argon.

Fluidization is achieved by a high rate of gas recycle to and through the bed, typically on the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned to the reactor at point 18 below the bed. A gas distribution plate 20 is positioned above the point of return to aid in the fluidization of the bed.

The portion of the gas stream which does not react in the bed constitutes the recycle gas which is removed from the polymerization zone, preferably by passing it into a velocity reduction zone 14 above the bed where entrained particles are given an opportunity to return to the bed. No fines removal equipment, such as cyclones or filters, is used in the fluidized bed system because of the danger of fines fusing therein.

The recycle gas is then compressed in a compressor 25 and then passed through a heat exchanger 26 wherein it is stripped of heat of reaction before it is returned to the bed. By constantly removing heat of reaction, no significant temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed, thereby maintaining itself at a substantially constant temperature under steady state conditions. The recycle is then returned to the reactor at its base 18 and to the fluidized bed through distribution plate 20. The compressor 25 can also be placed upstream of the heat exchanger 26.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type, or any similar plate known in the art. The elements of the plate may all be stationary, or the plate may be of the mobile type disclosed in U.S. Pat. No. 3,298,792, the entire contents of which are incorporated herein by reference. Whatever the design of the plate, it must diffuse the recycle gas through the particles at the base of the bed to keep them in a fluidized condition, and also serve to support a quiescent bed of resin particles when the reactor is not in operation. The mobile elements of or the plate may be used to dislodge any polymer particles entrapped in on the plate.

Hydrogen may be used in the polymerization reaction of the present invention in such amounts that the ratio of hydrogen to ethylene is between about 0 to about 2.0 moles of hydrogen per mole of the ethylene monomer in the gas stream. Any gas inert to the catalyst and reactants can also be present in the gas stream.

When the preferred embodiment of the invention is practiced, the magnesium modifier compound is combined with the activated catalyst either prior to or simultaneously with the introduction thereof into the reactor system.

It is essential to operate the fluid bed reactor at a temperature below the sintering temperature of the polymer particles. To insure that sintering will not occur, operating temperatures below the sintering temperature are desired. For the production of ethylene copolymers in the process of the present invention an operating temperature of about 30° to 105° C. is preferred, and a temperature of about 75° to 103° C. is most preferred. Temperatures of about 75° to 90° C. are used to prepare polymer products having a density of about 0.90 to 0.92 gms/cc, temperatures of about 80° to 100° C. are used to prepare products having a density of about 0.92 to 0.94 gms/cc, and temperatures of about 90° to 105° C. are used to prepare products having a density of about 0.94 to 0.96 gms/cc.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated catalyst is injected into the bed at a rate equal to its consumption at a point 30 which is above the distribution plate 20. Injecting the catalyst at a point above the distribution plate is an important feature of this process. Since the catalysts used in the practice of this invention are highly active, injection of the fully activated catalyst into the area below the distribution plate may cause polymerization to begin in that area and eventually cause plugging of the distribution plate. Injection into the viable bed, instead, aids in distributing the catalyst throughout the bed and tends to preclude the formation of localized spots of high catalyst concentration which may result in the formation of "hot spots".

A gas which is inert to the catalyst, such as nitrogen or argon, is used to carry the catalyst composition, and any additional modifier compound or non-gaseous chain transfer agent that is needed, into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accommodate the change in the rate of heat generation. This insures the maintenance of an essentially constant temperature in the bed. It will be apparent to those skilled in the art that complete instrumentation of both the fluidized bed and the recycle gas cooling system is necessary to detect any temperature change in the bed so as to enable the operator to make a suitable adjustment in the temperature of the recycle gas.

Under a given set of operating conditions, the fluidized bed is maintained at a substantially constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particulates settle to preclude further polymerization and sintering when the particle reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation.

Finally, the fluidized bed reactor is equipped with an adequate venting system to allow venting the bed during start up and shut down. The reactor does not require the use of stirring means and/or wall scraping means.

The highly active supported catalyst system of this invention yields a fluid bed product having an average particle size between about 0.005 to about 0.07 inches and preferably about 0.02 to about 0.04 inches.

The feed stream of gaseous monomer, with or without inert gaseous diluents, is fed into the reactor at a space time yield of about 2 to 10 pounds/hour/cubic foot of bed volume.

The use of the catalyst of the present invention in the fluidized bed polymerization process described above or in any other suitable olefin polymerization process, e.g., slurry process, produces polymers in which the net bottle weight and melt flow ratio characteristics can be simultaneously controlled without adversely affecting other properties of the polymers, such as strength thereof. The catalyst of the invention can be used to produce both linear low density polyethylene (LLDPE) and high density polyethylene (HDPE).

The following Examples further illustrate the essential features of the invention. However, it will be apparent to those skilled in the art that the specific reactants and reaction conditions used in the Examples do not limit the scope of the invention.

The properties of the polymers produced in the Examples were determined by the following test methods:
Density
ASTM D-1505—A plaque is made and conditioned for one hour at 100° C. to approach equilibrium crystallinity. Measurement for density is then made in a density gradient column; reported as gms/cc.
Melt Index (MI), $I_2$
ASTM D-1238—Condition E—Measured at 190° C.—reported as grams per 10 minutes.
High Load Melt Index (HLMI), $I_{21}$
ASTM D-1238—Condition F—Measured at 10 times the weight used in the melt index test above.
Melt Flow Ratio (MFR)=$I_{21}/I_2$
Weight Swell or Net Bottle Weight
Conducted on an Impco B-13 Blow Molding Machine. The machine is calibrated on a standard material, Marlex 5502, to give a 72.0±1.0 g bottle at a parison drop time of 2.0±0.03 sec. The test material is then introduced, and the machine readjusted to a 2.0 sec parison drop time. The measured weight is reported after correcting for the difference between the actual standard weight and 72.0 g.
Annular Die Swell (gr)
Measured by weighing 252 centimeters (cm) of a tube extruded at shear rate of 2000 1/sec through an annular die having a tapered entrance angle of 24.4°; die lend length of 3.05 mm; die gap of 0.505 mm and average die diameter of 5.16 mm.

EXAMPLE 1

Catalyst Synthesis

A catalyst composition of the invention was prepared in the following multi-step procedure.

Step 1 (Drying)—A chromium oxide coated silica (0.18% wt. Cr, calculated as chromium trioxide) having about 88% of its pore volume in the pore sizes of between 250 and 450 Angstroms (Crosfield's SD-186) was introduced into a fluid-bed drying vessel maintained under nitrogen (N$_2$) at an ambient temperature and pressure. The temperature of the vessel was increased at the rate of 25° C./hour until it reached about 200°-210° C. The silica was dried in nitrogen atmosphere at about 200°-210° C. for 16 hrs. It was then cooled to below 100° C. in 2-4 hrs.

Step 2 (Titanation)—30.0 grams of the product of Step 1 was charged to a 50 ml flask along with 250 ml of dry hexane. 10.5 ml of tetraisopropyltitanate was added at room temperature and the resulting brown slurry heated to 60°-65° C. under a vigorous nitrogen purge until the solid was dry (about 16-24 hrs). The hexane was removed in an oil bath with the temperature set at 65° C. over the period of 16 hrs.

Step 3 (Activation)—Under good fluidization, the product of Step 2 was heated at 25° C./hr until it reached the temperature of 325° C. It was then heated at 325° C. for 2 hours in nitrogen; the nitrogen atmosphere was changed to air; the temperature was increased from 325° C. to 825° C. at 100° C./hr; and, it was heated for 16 hrs at 825° C. in dry air. The temperature was then decreased to 350° C. as fast as possible. At 350° C., the air was again changed to nitrogen, and the temperature was decreased to ambient as fast as possible. The nitrogen purge was maintained for 1 hour at ambient temperature. The product was a yellow-orange catalyst which analyzed as follows:
Cr=0.18% wt.
Ti=3.5-5.3% wt.

EXAMPLE 2

Polymerization of Ethylene With 1-Butene

Under dry nitrogen, a 2-gallon autoclave reactor was filled with 5 liters of hexane. Approximately 1.5 grams of the activated catalyst of Example 1 was transferred to the reactor. The reactor was then heated to 90° C., after which 25 ml of 1-butene was added thereto. Finally ethylene was introduced into the reactor to bring the total pressure in the reactor to 150 psig. The polymerization was carried out for ½ hour at 150 psig total pressure, yielding approximately 693 grams of product. A 100 gram sample was used for the $M_{6000}$ test determination, which gave a value of 115%, indicating that the product is suitable for the HIC markets. It also indicates that this catalyst can be used to produce polymers for the HIC markets since laboratory slurry reactor resins having $M_{6000}$ values between 70 to 150% are suitable for such applications. Such catalysts generally produce fluid bed reactor products that meet the net bottle weight specification for blow molded bottles.

The $M_{6000}$ test is performed on molten resins using an Instron Rheometer (manufactured by Instron Corporation, 100 Royal Street, Canton, Mass. 02021) with a multiple entry angle die to eliminate melt fracture. The $M_{6000}$ values are calculated from the following equation:

$$M_{6000} = \frac{d_1 - d_o}{d_o} \times 100\%$$

where $d_o$ is the diameter of the die, and $d_1$ is the diameter of the extrudate. The test values are determined by measuring the die swell of samples at 6000 Sec$^{-1}$ shear rate. This shear rate falls within the typical range of shear rates ($10^3$ to $10^4$ sec$^{-1}$) at which the parison forms in a blow molding machine. Consequently, a correlation can be developed between the $M_{6000}$ values of a resin and the net bottle weight of blow molded bottles.

EXAMPLES 3-7

Polymerization of Ethylene with 1-Butene

The procedure of Example 2 was repeated in the apparatus of Example 2 with the catalyst of Example 1 at the experimental conditions of Example 2. The physical properties of resins produced in Examples 2-7 are summarized in Table 1 below.

TABLE 1

| Ethylene/1-Butene Copolymers Prepared in a Slurry Reactor with Example 1 Type Catalysts | | | | | |
|---|---|---|---|---|---|
| EXAMPLE | Melt Index | HLMI ($I_{21}$) | MFR ($I_{21}/I_2$) | Density (g/cc) | $M_{6000}$ (%) |
| 2 | 0.440 | 24.3 | 55.2 | 0.947 | 115 |

TABLE 1-continued

Ethylene/1-Butene Copolymers Prepared in a Slurry Reactor with Example 1 Type Catalysts

| EXAMPLE | Melt Index | HLMI ($I_{21}$) | MFR ($I_{21}/I_2$) | Density (g/cc) | $M_{6000}$ (%) |
|---|---|---|---|---|---|
| 3 | 0.159 | 14.3 | 90 | 0.955 | 99.2 |
| 4 | 0.299 | 32.9 | 110 | 0.952 | 112 |
| 5 | 0.137 | 11.5 | 84 | 0.952 | 129 |
| 6 | 0.302 | 34.6 | 114 | 0.951 | 127 |
| 7 | 0.205 | 15.7 | 76 | 0.949 | 128 |

The data of Table 1 indicates that all of the polymers produced with the catalyst of this invention have $M_{6000}$ values falling within the desired range of about 70 to about 150% for the HIC applications and about 33% of the resins have $M_{6000}$ values falling within the preferred range of about 100 to about 120% for the HIC applications.

EXAMPLE 8

Catalyst Synthesis

A catalyst composition of the invention was prepared by the following multi-step procedure.

Step 1—Chromium oxide coated silica having majority of pore sizes between 250 and 450 Angstrom (Crosfield's SD-186) was dried at 200° C. under a nitrogen purge for about 16 hours.

Step 2—21 g of the solid product of Step 1 was slurried in 100 ml hexane and this catalyst intermediate treated with 7.5 ml of tetraisopropyltitanate at room temperature and the resulting slurry heated at 60°-80° C. under a vigorous nitrogen purge until the solid was dry (about 16-24 hrs). The hexane was removed in an oil bath with the temperature set at 70° C. over the period of 16-24 hrs.

Step 3—Under good fluidization, the catalyst precursor was heated to 300° C. in a nitrogen stream. At 300° C., the nitrogen was replaced by dry air. The temperature was then raised and held at 825° C. After 16 hours activation, the catalyst precursor was rapidly cooled to 150° C. under dry air, and then to ambient temperature with nitrogen.

EXAMPLE 9

Polymerization of Ethylene With 1-Butene and With Di-n-Butyl Magnesium Added To The Polymerization Reactor Under dry nitrogen, a 1-gallon autoclave reactor was filled with 2 liters of hexane. Sufficient di-butyl magnesium (a 0.6 Molar solution of dibutyl magnesium in heptane, manufactured by and available from the Lithium Corporation of America, Gastonia, N.C. 28052) was added to the reactor to give a concentration of 25 ppmw of the dibutyl magnesium (DBM) in the reactor. Approximately 1.8 g of the activated catalyst precursor of Example 8 was transferred to the reactor. The reactor was then heated to 90° C., after which 10 ml of 1-butene was added thereto. Finally, ethylene was introduced into the reactor to bring the total pressure in the reactor to 180 psig. The polymerization was carried out for 1 hour at 180 psig total pressure, yielding approximately 800 grams of product. A 100 g sample was used for the $M_{6000}$ test determination, which gave a value of 109%, indicating that the product is suitable for the HIC markets. It also indicates that this catalyst can be used to produce polymers for the HIC markets since laboratory slurry reactor resins having $M_{6000}$ values between about 70 to about 150% are suitable for such applications. Such catalysts generally produce fluid bed reactor products that meet the net bottle weight specification for blow molded bottles.

Other properties of the polymer product are listed below.

Density: 0.954 gr/cc
Melt Index ($I_2$): 0.13 gr/10 min
HLMI ($I_{21}$): 12.6 gr/10 min
MFR ($I_{21}/I_2$): 96.9

EXAMPLES 10-13

Polymerization of Ethylene With 1-Butene

The procedure of Example 9 was repeated in the apparatus similar to that of Example 9, using a 2-gallon autoclave reactor, but DBM levels were varied for each experiment. The remaining experimental conditions were similar to those of Example 9. The DBM levels and the properties of the polymer products are set forth below in Table 2.

TABLE 2

Ethylene/1-Butene Copolymers Prepared in a Slurry Reactor with Example 1 Type Catalysts

| EXAMPLE | DBM Level (ppm) | Melt Index ($I_2$) | HLMI ($I_{21}$) | MFR ($I_{21}/I_2$) | Density (g/cc) | $M_{6000}$ (%) |
|---|---|---|---|---|---|---|
| 10 | 15 | 0.28 | 22.7 | 80 | 0.949 | 104 |
| 11 | 15 | 0.17 | 11.7 | 70 | 0.949 | 120 |
| 12 | 15 | 0.21 | 14.8 | 70 | 0.951 | 116 |
| 13 | 30 | 0.26 | 21.7 | 84 | 0.948 | 108 |

90° C., 5 liter hexane as diluent, and 25 ml of 1-butene in a 2-gallon autoclave reactor

EXAMPLE 14

Catalyst Preparation 300 kg of Crosfield's SD-186 silica (0.18 wt % Cr as $CrO_3$) was dehydrated at 210° C. for 16 hours in a fluidized bed vessel at a gas flow rate of 0.1 ft/sec. according to the following schedule:

| Temp °C. | Time or Rate | Fluidizing Gas |
|---|---|---|
| Ambient to 210 | 25° C./hr | $N_2$ |
| Hold at 210 | 16 hrs | $N_2$ |
| Cool Below 100 | About 3 hrs | $N_2$ |

271 kg of the dehydrated silica was added to a catalyst mix vessel. 2300 liters of fresh isopentane was charged to slurry the silica at ambient temperature. Subsequently, 114 kg of neat teraisopropyl titanate (TIPT) was injected at 55° C. and the titanated silica slurry was agitated at 55° C. for two hours. The titanated silica was dried over a 24 hour period with a jacket temperature of 100° C. and a nitrogen purge of 18 kg/hr.

The titanated silica was activated according to the following schedule.

| Temp, °C. | Time or Rate | Fluidizing Gas |
|---|---|---|
| Ambient to 200 | 25° C./hr | $N_2$ at 0.1 ft/sec |
| 200 | 2 hour hold | $N_2$ at 0.1 ft/sec |
| 200–315 | 25° C./hr | $N_2$ at 0.1 ft/sec |
| 315 | 3 hour hold | $N_2$ at 0.1 ft/sec |
| 315 | 4 hour hold | $N_2$ at 0.17 ft/sec |
| 315–845 | 25° C./hr | $N_2$ at 0.17 ft/sec |
| 845 | 16 hour hold | Air |
| 845–150 | As fast as possible | Air |
| 150–Ambient | About 3 hours | $N_2$ |

EXAMPLES 15-18

Fluid Bed Polymerization Process

The catalyst of Example 14 was compared to a prior art catalyst prepared substantially in the manner of Hogan et al, U.S. Pat. No. 3,622,521 or Levine et al, U.S. Pat. No. 4,011,382, except that fluorine was not used in synthesizing the comparative catalyst. The comparison was carried out by using both catalysts in a gas phase fluid bed reactor of Example 33 to polymerize ethylene with 1-hexene. Three catalyst samples of this invention were compared to two catalyst samples of the prior art catalyst, synthesized substantially in the manner of the aforementioned Hogan et al patent (hereinafter the "Hogan et al catalyst"). In Example 15 the catalyst of Example 14 was used with no dibutyl magnesium (DBM), while in Example 16 it was used with DBM added to the fluid bed reactor. In Example 17, the catalyst of Hogan et al was used with DBM added to the fluid bed reactor, while in Example 18, it was used without DBM. The results are summarized below in Table 3.

TABLE 3

| Ex. No. | Catalyst of Example | DBM (ppm) | $O_2$ (ppm) | T (°C.) | Fines % | Weight Swell (gms) | Annular Die Swell (gms) | HLMI |
|---|---|---|---|---|---|---|---|---|
| 15 | 14 | 0 | 0.12 | 100 | 1.7 | 80.1 | 1.25 | 30 |
| 16 | 14 | 2 | 0.28 | 100 | 3.6 | 80.3 | 1.22 | 32 |
| 17 | Hogan et al | 2 | 0.28 | 101.5 | 3.1 | 81.7 | 1.31 | 34 |
| 18 | Hogan et al | 0 | 0.12* | 104 | 1.0 | 79.9 | 1.25 | 33 |

*Adjusted for impurity baseline difference.

The data of Table 3 indicates that the catalyst of this invention produces resins of about the same high load melt index (HLMI), as the prior art catalyst compositions but at temperature of 1.5° to 4° C. lower than the prior art catalyst compositions.

EXAMPLE 19

Catalyst Preparation With Di-Butyl Magnesium Incorporated Into The Catalyst Outside of the Reactor The first three synthesis steps of the catalyst composition of this example were identical to those of the Example 8 catalyst composition synthesis. The product of Step 3 was then treated in accordance with the procedure of Step 4, set forth below.

Step 4—Under a nitrogen atmosphere, 5 grams of the Step 3 product was slurried in 75 ml of hexane. 1.25 ml of the same di-butyl magnesium composition as was used in Example 9 was added and the slurry was stirred for 30 minutes. The hexane was driven off under a nitrogen purge at 100°-200° C. to form a free flowing solid. Elemental analysis of this solid gave a Mg to Cr molar ratio of 7.6 and a Ti to Cr molar ratio of 25.

EXAMPLE 20

Polymerization of Ethylene With 1-Butene

The catalyst of Example 19 was used to polymerize 1-butene with ethylene in the apparatus of Example 10.

In a 2-gallon autoclave reactor containing 5 l of hexane, at 90° C., approximately 1.9 gr of Example 19 catalyst was used to polymerize 25 cc of 1-butene with a sufficient amount of ethylene to provide a partial pressure of ethylene in the autoclave of 115 psig. The polymerization was carried out for ¾ hr. at 150 psig total pressure, producing approximately 872 grams of product. A 100 gram sample of the product was used for the $M_{6000}$ tests which indicated that the polymer had $M_{6000}$ values of 105 to 120%. Other properties of the polymer are listed below.

Density: 0.948 g/cc
Melt Index ($I_2$): 0.53 g/10 Min.
HLMI ($I_{21}$): 26.3 g/10 Min.
MFR ($I_{21}/I_2$): 50

EXAMPLES 21-30

Polymerization of Ethylene With 1-Butene

The procedure of Example 20 was repeated in the apparatus of Example 20, but DBM levels were varied for each experiment to provide varying molar ratios of magnesium to chromium (Mg/Cr) in the catalyst composition. The remaining experimental conditions were identical to those of Example 20. The Mg/Cr molar ratios and the properties of the polymer products are set forth below in Table 4.

TABLE 4

Ethylene/1-Butene Copolymers Prepared
In a Slurry Reactor with Example 19 Type Catalysts

| EXAMPLE | Mg/Cr Molar Ratio | Melt Index ($I_2$) | HLMI ($I_{21}$) | MFR ($I_{21}/I_2$) | Density (g/cc) | $M_{6000}$ (%) |
|---|---|---|---|---|---|---|
| 21 | 4.4 | 0.49 | 33.5 | 69 | 0.953 | 136 |
| 22 | 5.0 | 0.25 | 17.8 | 71 | 0.952 | 115 |
| 23 | 5.0 | 0.16 | 17.1 | 107 | 0.951 | 116 |
| 24 | 6.0 | 0.12 | 8.6 | 72 | 0.951 | 128 |
| 25 | 7.6 | 0.24 | 16.3 | 68 | 0.948 | 108 |
| 26 | 7.6 | 0.53 | 26.3 | 50 | 0.948 | 112 |
| 27 | 9.4 | 0.14 | 14.9 | 106 | 0.949 | 112 |
| 28 | 9.4 | 0.17 | 12.0 | 69 | 0.948 | 108 |
| 29 | 13.5 | 0.23 | 17.6 | 75 | 0.949 | 116 |
| 30 | 21.5 | 0.13 | 11.9 | 90 | 0.948 | 112 |

90° C., 5 liter hexane as diluent, and 25 ml of 1-butene.

EXAMPLE 31

Polymerization of Ethylene With 1-Butene

The procedure of Example 9 was repeated in the apparatus of Example 9 with the catalyst prepared substantially according to the procedure of Example 8. A sufficient amount of the di-butyl magnesium, used in Example 9, was added to the reactor to give a concentration of about 30 ppmw of DBM therein. About 1.3 grams of the catalyst was transferred to the reactor. The reactor was then heated to about 90° C. and about 10 ml of 1-butene was added thereto. A sufficient amount of ethylene was introduced into the reactor to maintain partial ethylene pressure in the reactor of 120-125 psia. The polymerization was carried out for 1 hour, yielding 305.5 grams of product. The product properties were:

Density: 0.946 gr/cc
Melt Index ($I_2$): 0.178 gr/10 min
HLMI ($I_{20}$): 12.5 gr/10 min

MFR: 70.2
M$_{6000}$: 113%

EXAMPLES 32-33

Fluid Bed Polymerization Process

A gas phase polymerization experiment was carried out in an 18-inch diameter pilot plant fluid bed reactor using the DBM-pretreated catalyst prepared in accordance with the procedure of Example 19.

The pilot plant fluid bed reactor was substantially similar in construction and operation to the fluidized bed reaction system described above. Specific run conditions for Examples 32 and 33, and product properties of the resulting polymer and of the "control" polymer are set forth below in Table 5.

TABLE 5

| Fluid Bed Polymerization Results for DBM-Pretreated Catalyst* | | | |
|---|---|---|---|
| Example | 32 | 33 | Control** |
| Butene/Ethylene Molar Ratio | 0.00160 | 0.00170 | — |
| Oxygen (ppm) | — | 0.11 | — |
| Polymerization Temperature (°C.) | 109 | 105 | — |
| Ethylene Partial Pressure, psia | 185 | 179 | — |
| Reactor Pressure, psig | 297 | 314 | — |
| Melt Index, I$_2$ | 0.88 | 0.60 | 0.33 |
| HLMI, I$_{21}$ | 50 | 41 | 39 |
| MFR | 57 | 69 | 117 |
| Density, g/cc | 0.957 | 0.957 | 0.954 |
| Net Bottle Weight at 6000 sec$^{-1}$ apparent shear rate, grams | 65.2 | 66.9 | 66 ± 1 |

*Mg/Cr molar ratio ~ 6/1
**Commercially-available HJC product believed to have been prepared from a resin subjected to post-polymerization processing.

The polymer prepared in the fluid bed pilot plant reactor was compared with a control sample of a similar polymer, commercially available under the tradename of Bakelite 6369 from the Union Carbide Corporation, Danbury, Conn. Such commercial polymer, it is believed, was subjected to post-polymerization processing steps necessary to impart to it suitable die swell characteristics. The comparison (Table 5) of the commercial polymer with that prepared in the pilot plant fluidized bed reactor indicates that the polymer prepared with the catalyst of the present invention has substantially the same die swell characteristics as the commercially available polymer, without the post-polymerization processing steps.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

What is claimed is:

1. In an alpha-olefin polymerization catalyst composition comprising a chromium compound and a titanium compound deposited on a refractory oxide support, an improvement comprising a catalyst which is substantially non-spherical and irregular in shape, wherein the refractory oxide support has at least 75% of its pore volume in the pore size range of about 200 to about 500 Angstrom diameter, thereby producing a catalyst which produces a polymer having a higher flow index (HLMI) than a polymer produced under comparable conditions with a catalyst having a broader pore size distribution.

2. A catalyst composition of claim 1 which is a fluidized bed catalyst composition.

3. A catalyst composition of claim 2 which has the particle diameter of about 5 to about 250μ.

4. A catalyst composition of claim 3 which has the particle diameter of about 10 to about 200μ.

5. A catalyst composition of claim 4 which has the following particle size distribution:cumulative volume distribution—10 to 90% of the catalyst particles have diameters of from about 37 to about 117μ, as determined by volume distribution.

6. A catalyst composition of claim 5 which has a median particle diameter of about 75μ, as determined by volume distribution.

7. A catalyst composition of claim 6 wherein CrO$_3$ or any compound of chromium calcinable to CrO$_3$ under the catalyst activation conditions is used as the chromium compound.

8. A catalyst composition of claim 7 wherein it is activated for at least about 10 hours at a temperature of at least about 800° C.

9. A catalyst composition of claim 8 wherein the refractory oxide support is silica having at least 80% of its pore volume in the pores of about 250 to about 450 Angstrom diameter.

10. A catalyst composition of claim 9 wherein the refractory oxide support is silica having at least 85% of its pore volume in the pores of about 250 to about 450 Angstrom diameter.

11. A catalyst composition of claim 10 containing about 0.05 to about 3.0% by weight of chromium, calculated as elemental chromium.

12. A catalyst composition of claim 11 containing about 0.10 to about 0.25% by weight of chromium, calculated as elemental chromium.

13. A catalyst composition of claim 12 containing about 0.13 to about 0.18% by weight of chromium, calculated as elemental chromium.

14. A catalyst composition of claim 13 containing about 0.15 to about 0.18% by weight of chromium, calculated as elemental chromium.

15. A catalyst composition of claim 14 wherein the refractory oxide support is silica containing 0.18% by weight of CrO$_3$ and having about 88% of its pore volume in the pores of about 250 to about 450 Angstrom diameter.

16. A catalyst composition of claim 15 wherein, prior to the activation thereof, it is dehydrated at a temperature of about 100° to about 500° C. for at least about 14 hours in a nitrogen atmosphere.

17. A catalyst composition of claim 16 wherein it is dehydrated at a temperature of about 150° to about 300° C. for at least about 16 hours.

18. A catalyst composition of claim 17 wherein it is dehydrated at a temperature of about 200° C. for about 16 hours.

19. A catalyst composition of claim 18 wherein after the dehydration is completed, the titanium compound is deposited thereon.

20. A catalyst composition of claim 19 wherein, after the titanium compound deposition is completed, it is activated at a temperature of at least about 820° C. for at least about 16 hours.

21. A catalyst composition of claim 20 wherein it is activated at a temperature of about 820° to about 870° C.

22. A catalyst composition of claim 21 wherein it is activated at a temperature of about 825° C. for about 16 hours.

23. A catalyst composition of claim 22 further comprising a sufficient amount of a magnesium composition of the formula RMgR', where R and R' are the same or different and they are $C_1$ to $C_{12}$ hydrocarbyl groups, to provide a molar ratio of magnesium to chromium in the catalyst composition of about 0.01:1 to about 25:1.

24. A catalyst composition of claim 23 wherein R and R' are $C_1$ to $C_8$ alkyl groups.

25. A catalyst composition of claim 24 wherein R and R' are $C_2$ to $C_4$ normal alkyl groups.

26. A catalyst composition of claim 25 wherein R and R' are the same and they are n-butyl.

27. A catalyst composition of claim 26 comprising such an amount of the magnesium composition as to provide a molar ratio of magnesium to chromium in the catalyst composition of about 0.1:1 to about 15:1.

28. A catalyst composition of claim 27 wherein the polymerization catalyst is combined with the magnesium composition outside of a polymerization reaction vessel.

29. A catalyst composition of claim 27 wherein the polymerization catalyst is combined with the magnesium composition inside of a polymerization reaction vessel.

30. A method of preparing a supported alpha-olefin polymerization catalyst composition comprising the steps of:
(a) depositing a chromium compound on a refractory oxide support having at least 75% of its pore volume in the pores of about 200 to about 500 Angstrom diameter;
(b) dehydrating the product of step (a) at about 100° to about 500° C. for at least about 16 hours;
(c) contacting the product of step (b) with a titanium compound; and
(d) activating the product of step (c) at at least about 820° C. for at least about 16 hours, thereby producing the catalyst composition which is substantially non-spherical and irregular in shape and which has a relatively broad particle size distribution range.

31. A method of claim 30 wherein the catalyst composition is a fluidized bed catalyst composition.

32. A method of claim 31 wherein the catalyst composition particles have the particle diameter of about 5 to about 250$\mu$.

33. A method of claim 32 wherein the catalyst composition particles have the particle diameter of about 10 to about 200$\mu$.

34. A method of claim 33 wherein the catalyst composition particles have the following particle size distribution:cumulative volume distribution—10 to 90% of the particles have diameters from about 37 to about 117$\mu$ as determined by volume distribution.

35. A method of claim 34 wherein the catalyst composition particles have a median particle diameter of about 75$\mu$, as determined by volume distribution.

36. A method of claim 35 wherein the chromium compound is $CrO_3$ or any compound of chromium calcinable to $CrO_3$ under the catalyst activation conditions.

37. A method of claim 36 wherein the refractory oxide support is silica having at least 80% of its pore volume in the pores of about 250 to about 450 Angstrom diameter.

38. A method of claim 37 wherein the refractory oxide support is silica having at least 85% of its pore volume in the pores of about 250 to about 450 Angstrom diameter.

39. A method of claim 38 wherein the catalyst composition contains about 0.05 to about 3.0% by weight of chromium, calculated as elemental chromium.

40. A method of claim 39 wherein the catalyst composition contains about 0.10 to about 0.25% by weight of chromium, calculated as elemental chromium.

41. A method of claim 40 wherein the catalyst composition contains about 0.13 to about 0.18% by weight of $CrO_3$, calculated as elemental chromium.

42. A method of claim 41 wherein the catalyst composition contains about 0.15 to about 0.18% by weight of $CrO_3$, calculated as elemental chromium.

43. A method of claim 42 wherein the refractory oxide support is silica containing 0.18% by weight of $CrO_3$ and having about 88% of its pore volume in the pores of about 250 to about 450 Angstrom diameter.

44. A method of claim 43 wherein the product of step (a) is dehydrated at a temperature of about 150° to about 300° C. for at least about 16 hours in a nitrogen atmosphere.

45. A method of claim 44 wherein the product of step (a) is dehydrated at a temperature of about 200° C. for about 16 hours.

46. A method of claim 45 wherein the product of step (c) is activated at a temperature of at least about 820° C. for at least about 16 hours.

47. A method of claim 46 wherein the product of step (c) is activated at a temperature of about 820° to about 870° C.

48. A method of claim 47 wherein the product of step (c) is activated at a temperature of about 825° C. for about 16 hours.

49. A method of claim 48 wherein the catalyst composition is combined with a sufficient amount of a magnesium composition of the formula RMgR' where R and R' are the same or different and they are $C_1$ to $C_{12}$ hydrocarbyl groups to provide a molar ratio of magnesium to chromium in the catalyst composition of about 0.01:1 to about 25:1.

50. A method of claim 49 wherein R and R' are $C_1$ to $C_8$ alkyl groups.

51. A method of claim 50 wherein R and R' are $C_2$ to $C_4$ normal alkyl groups.

52. A method of claim 51 wherein R and R' are the same and they are n-butyl.

53. A method of claim 52 wherein a sufficient amount of the magnesium composition is used to provide a molar ratio of magnesium to chromium in the catalyst composition of about 0.1:1 to about 15:1.

54. A method of claim 53 wherein the polymerization catalyst is combined with the magnesium composition outside of a polymerization reaction vessel.

55. A method of claim 54 wherein the polymerization catalyst is combined with the magnesium composition inside of a polymerization reaction vessel.

* * * * *